Jan. 23, 1968   H. SCHMITZ   3,365,047
APPARATUS FOR ADVANCING CANDIES AND THE LIKE
Filed Nov. 23, 1965
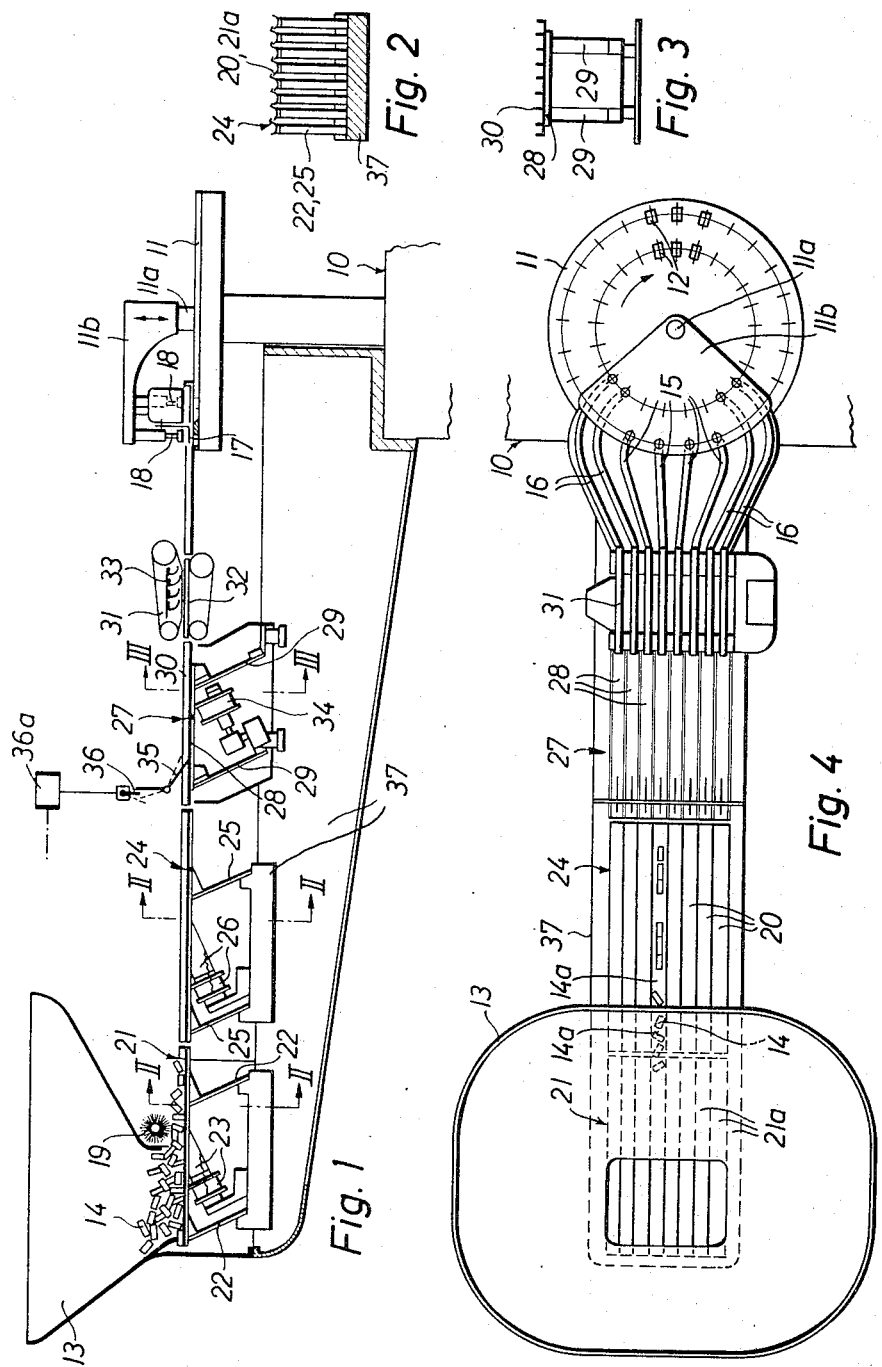
INVENTOR:
HEINZ SCHMITZ
BY Michael S. Striker
his ATTORNEY United States Patent Office 3,365,047
Patented Jan. 23, 1968

3,365,047
APPARATUS FOR ADVANCING CANDIES
AND THE LIKE
Heinz Schmitz, Effern, near Cologne, Germany, assignor
to Franz Theegarten, Cologne-Muengersdorf, Germany
Filed Nov. 23, 1965, Ser. No. 509,298
9 Claims. (Cl. 198—30)

ABSTRACT OF THE DISCLOSURE

Apparatus for feeding stick-shaped candies from a magazine to a packing machine. Comprises a first conveyor having a channel which receives from the magazine a continuous column of randomly distributed candies, a second conveyor having a channel which receives candies from the channel of the first conveyor at such a rate that the candies are separated from each other by gaps wide enough to permit reorientation of misaligned candies, and vibrators which shake the conveyors and cause candies to advance toward the packing machine. The gaps develop during transfer of candies from the first to the second conveyor and the speed of candies in the channel of the second conveyor exceeds their speed in the channel of the first conveyor.

---

The present invention relates to an apparatus for advancing candies and similar relatively small products of other than cubical shape. More particularly, the invention relates to an apparatus for advancing candies or similar elongated substantially stick-shaped products from a source of randomly distributed products to a packing, wrapping or other consuming machine which must receive each such product in a predetermined optimum position for further processing. Still more particularly, the invention relates to an apparatus for arraying stick-shaped products while the products are caused to advance from a source to a transfer station and with a view to insure that each product actually reaches the transfer station while moving lengthwise.

In heretofore known apparatus for advancing candies from a source of randomly distributed products to a transfer station, the products are caused to advance in an elongated channel which receives the products by gravity feed and is combined with a suitable drive which causes a column of products to move toward the transfer station. During feeding of products into one end of the channel, at least some of the products happen to lie transversely of the channel and, since the products which enter the channel form a continuous column, they have no room to align themselves, i.e., to assume such positions that their longitudinal extensions coincide with the longitudinal extension of the channel. As a rule, the transfer station should receive the candies in such a way that each candy which approaches this station must move lengthwise.

In order to insure proper orientation of candies on their way from the source to the transfer station which delivers properly positioned candies to a packing or wrapping machine, manufacturers must employ workers who supervise the movement of products between the source and the transfer station and use their hands to change the position of each misaligned candy. It is often necessary to place two, three or even more workers next to each transfer line which obviously results in considerably increased cost of the ultimate products. All heretofore known attempts to provide for automatic reorientation of misaligned candies have met with little commercial success, mainly because the presently known automatic arraying or reorienting devices are too complicated, too expensive and/or unreliable so that it is still necessary to utilize supervising personnel.

Accordingly, it is an important object of the present invention to provide a novel apparatus for advancing and arraying or reorienting elongated substantially stick-shaped candies and like products and to construct and assemble the apparatus in such a way that each misaligned product is automatically caused to change its position before it reaches the transfer station.

Another object of the invention is to provide an apparatus of the just outlined characteristics which occupies very little room, which is of relatively simple and rugged construction, which can operate properly irrespective of fluctuations in the rate of feed of randomly distributed products, and which can be readily installed in production lines utilizing presently known packing, wrapping or other consuming machines.

A further object of the invention is to provide a novel transporting unit which may be used in an apparatus of the above outlined characteristics and to construct and assemble the transporting unit in such a way that its capacity may be changed at will in order to supply properly arrayed products to a single consuming machine or to two or more consuming machines.

An additional object of the instant invention is to provide a fully automatic advancing and arraying apparatus which is not prone to malfunction, which requires no supervision, which can be readily installed on existing packing or wrapping machines, and which can be used in connection with different types of elongated products, particularly for conveying and arraying of products which resemble elongated parallelepipeds, elongated blocks of other than rectangular cross section, and many other types of shapes not including spherical and cubical shapes.

A concomitant object of the invention is to provide a novel system of conveyors which may be used in the aforementioned transporting unit and to further provide the apparatus with automatic control means for regulating the advance of products along the conveyors to make sure that each misaligned product will have ample time and ample room for proper orientation on its way from the source to the transfer station.

Briefly stated, one feature of my present invention resides in the provision of an apparatus for reorienting or arraying elongated stick-shaped products, particularly candies and other relatively small bodies of other than cubical shape, while such products advance to a packing or other consuming machine. The apparatus comprises a hopper or another suitable source of randomly distributed products, a transfer station which is distant from the source and is provided with means for feeding properly oriented products into the consuming machine, and transporting means for advancing the products from the source to the transfer station and for simultaneously arraying all misaligned products so that each product reaches the transfer station by moving lengthwise. In accordance with the invention, the transporting means comprises a first conveyor having a first elongated channel for receiving randomly distributed products from the source, preferably by gravity feed, so that the products in the first channel form a substantially continuous column including properly oriented and misaligned products. The first conveyor also includes a vibrator unit or another suitable drive for advancing the column in the first channel lengthwise and away from the source, and the transporting means further comprises a second conveyor which is located between the first conveyor and the transfer station and includes a second elongated channel arranged to receive products seriatim from the first channel at such a rate that the products are separated by gaps wide enough to permit reorientation of each such misaligned product which advances in a position other than lengthwise. The second conveyor also comprises a vibrator unit or another suitable drive which effects reorientation of misaligned products in the second channel and advances the products toward the transfer station.

For example, the drive of the first conveyor may operate intermittently and the drive of the second conveyor may operate continuously. Alternatively, each of the two drives may operate intermittently but the intervals between consecutive operations of the drive which forms part of the first conveyor may be longer than the intervals between consecutive operations of the other drive. Also, both drives may operate continuously but the advancing action of the second drive may be more intensive than the advancing action of the first drive so that the aforementioned gaps invariably develop during transfer of products from the first channel into the second channel.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a somewhat schematic side elevational view of an apparatus which is utilized for advancing and arraying elongated candies of rectangular cross section;

FIG. 2 is a fragmentary transverse vertical section substantially as seen in the direction of arrows from one of the lines II—II shown in FIG. 1;

FIG. 3 is a fragmentary transverse vertical section substantially as seen in the direction of arrows from the line III—III of FIG. 1; and FIG. 4 is a top plan view of the apparatus.

Referring now to the drawings in detail, there is shown an apparatus which is used for conveying candies 14 from a source in the form of a hopper 13 to the transfer station of a candy packing or wrapping machine 10. The transfer station accommodates a rotary disk-shaped turntable or feeder 11 which is spaced from the hopper 13 and is located at a level above the machine 10. In the illustrated embodiment, each candy 14 resembles a parallelepiped with six sides each of which constitutes a parallelogram, but four sides are relatively long so that the candies resemble elongated sticks. The purpose of the apparatus is to advance the candies from the source 13 to the feeder 11 in such a way that, at the time it actually reaches the feeder, each candy 14 must advance lengthwise.

The upper side of the feeder 11 is provided with two concentric annuli of pockets or holders 12 into which the candies must be introduced for delivery to the actual packing or wrapping station or stations of the machine 10. The hopper 13 accommodates a supply of randomly distributed candies 14 and has an outlet at its lower end so that the candies may descend by gravity feed to come to rest on the first conveyor 21 of a multi-conveyor transporting unit extending between the hopper 13 and the feeder 11. In the illustrated embodiment, the transporting unit actually consists of eight parallel transporting units which are located side-by-side and each of which can advance a separate row or file of properly arrayed candies 14 to the transfer station occupied by the feeder 11.

That portion of the transporting unit which is immediately adjacent to the feeder 11 constitutes a fifth conveyor composed of two sets of fixed arcuate channels including two pairs of outer channels 16 and four median or central channels 15. These channels 15 and 16 diverge substantially fanwise in a direction away from the hopper 13 and thereupon converge at a level above the feeder 11 in such a way that the discharge ends of the outer channels 16 are located directly above a portion of the annulus formed by the inner pockets 12. The discharge ends of the inner channels 15 are located directly above a portion of the annulus which is formed by the outer pockets 12. In other words, the pockets 12 of each annulus may receive as many as four candies 14 at a time. The shaft 11a of the feeder 11 supports an overhanging bracket 11b which can move up and down and supports two sets of four transfer members or plungers 18 each of which is located above two movable intercepting members 17. Each properly positioned candy 14 which reaches the discharge end of one of the channels 15 or 16 descends onto the respective pair of intercepting members 17. The feeder 11 is rotatable by a suitable indexing mechanism (not shown) and, when it comes to a halt, the bracket 11b descends while the intercepting members 17 move sideways so that the plungers 18 may transfer the candies into the registering pockets 12. From there on, the candies are delivered to the wrapping station or stations in a manner not forming part of my present invention. The just described mode of transferring candies into the pockets 12 allows for very rapid delivery to the wrapping station. It was found that a transporting unit with eight separate channels 15, 16 enables the machine 10 to turn out an exceptionally large number of wrapped products per unit of time.

The candies which descend onto the first conveyor 20 in random distribution must have sufficient room to reorient themselves on their way from the outlet of the hopper 13 to the intake ends of the channels 15 and 16. Each elongated channel 21a of the first conveyor 21 actually receives a complete or continuous column of candies 14 wherein some of the candies extend transversely or nearly transversely with reference to the longitudinal direction of the respective channel 21a. A rotary refuser 19 in the form of a brush is immediately adjacent to the outlet of the hopper 13 above the conveyor 21 and serves to insure that the columns of randomly positioned candies in the channels 21a of the first conveyor 21 form single layers, i.e., that the candies are not conveyed on top of each other because such positioning of candies would impede proper orientation. However, this refuser 19 by itself cannot reorient improperly positioned candies, mainly because the columns in the channnnels 21a are continuous or substantially continuous so that there is no room for improperly positioned candies to be oriented in a way to extend lengthwise of the channels 21a. For example, if a candy 14 comes to rest in its channel 21a crosswise and is immediately adjacent to two properly oriented candies, at least one of the properly oriented candies must be moved away from the improperly positioned candy so that the latter will have room to reorient itself and to move into alignment with the two nearest candies. In some instances, a crosswise positioned candy must be turned through full 90 degrees.

Each of the eight separate channels 21a is supported by two suitably inclined swingable arms 22 which may constitute leaf springs and allow the respective channels to move with reference to each other. The drive of the conveyor 21 comprises a battery of eight separate vibrators 23 of known design which are mounted below the respective channels 21a and impart to such channels movements which cause the corresponding columns of candies 14 to move in a direction away from the outlet of the hopper 13, i.e., toward the channels 15, 16. Each vibrator 23 may comprise an electric motor.

The transporting unit further comprises a second conveyor 24 which is located between the transfer station and the conveyor 21 and serves to receive from the channels 21a candies 14 at such a rate that consecutive candies of each column are separated from each other by gaps 14a which permit for reorientation or realignment of each improperly positioned candy. The second conveyor 24 again comprises eight separate channels 20 each of which registers with one of the channels 21a and each of which is supported by two suitably inclined springy arms 25. The conveyor 24 further comprises a drive composed of eight vibrators 26, one for each channel 20. The vibrators 26 vibrate the channels 20 in such a way that candies supported by the second conveyor 24 advance faster than candies on the first conveyor 21. This results in automatic formation of gaps 14a between the adjoining candies in the channels 20.

A third conveyor 27 of the transporting unit is located immediately downstream of the conveyor 24 and comprises eight interconnected elongated channels 28, each of these channels 28 being in registry with one of the channels 20. The channels 28 may form a rigid plate-like body which rests on suitably inclined springy arms 29. The third conveyor 27 may comprise a single vibrator 34. The partitions between the individual channels 28 of the third conveyor 27 are constituted by longitudinally extending walls 30. The channels 28 convey the candies 14 toward the intake ends of the fixed channels 15 and 16. Since the channels 15 and 16 are not straight, the transporting unit further comprises a fourth conveyor which is disposed between the channels 28 on the one hand and the channels 15, 16 on the other hand. This fourth conveyor enables the candies 14 to overcome the friction which develops when they travel in the arcuate channels 15, 16 and comprises two sets of endless belts 31, 32 which are driven in opposite directions. The upper stringers of the lower belts 32 extend between the channels 28 and 15, 16 and serve to support rows of properly aligned or arrayed candies while the candies move across the space between the third and fifth conveyors. The lower stringers of the upper belts 31 are located above the upper stringers of the belts 32 and are preferably biased by suitably inclined springs 33 so that they actually bear against the top faces of candies on the belts 32 and compel them to enter the intake ends of the channels 15, 16. In the channels 15, 16, the candies form columns by being disposed end-to-end, and such columns are compelled to advance toward the respective pairs of intercepting members 17 under the action of continuously travelling belts 31 and 32. The aforementioned fifth conveyor is constituted by the fixed channels 15, 16. The width of channels 15, 16 need not materially exceed the width of the candies.

The conveyor 27 is located below a set of sensing elements or detectors 35 which are lifted by candies 14 advancing in the corresponding channels 28. Each detector 35 cooperates with a separate normally open switch 36 which can control one of the vibrators 23 and/or 26. The conveyors 21, 24 may be operated in such a way that the second conveyor 24 is driven continuously while the first conveyor 21 operates intermittently or that the conveyors 21 and 24 are operated intermittently. The intervals between intermittent operations of the first conveyor 21 are normally rather short. As soon as the vibrators 23 for the channels 21a are arrested, the corresponding columns of in part randomly positioned candies 14 come to a halt and the channels 21a cease to feed candies into the aligned channels 20. If the conveyor 24 operates continuously, the column of candies 14 in the channels 20 is stretched out in the longitudinal direction of such channels and each improperly positioned candy has sufficient room to assume a position in which its longitudinal extension coincides with the longitudinal extension of the corresponding channel 20. The generation of impulses for proper orientation of candies in the channels 20 is due to the fact that one end of each improperly positioned candy is located at a level above the other end by resting on the partition between the adjoining channels 20. Due to vibrations imparted by the corresponding vibrator 26, the candy slides and turns until it assumes a desired position and thereupon moves only lengthwise. The configuration of channels 20 is shown in FIG. 2, and it will be seen that each such channel may be of concave shape which also contributes to rapid reorientation of improperly positioned candies.

As stated hereinbefore, proper orientation of candies in the channels 20 of the second conveyor 24 is possible only if the gaps 14a between adjoining candies are wide enough to allow for turning of a transversely extending candy. The detectors 35 insure that the transporting unit invariably provides such gaps in a fully automatic way. Thus, if a detector 35 detects a longer column or row of end-to-end arranged candies in the corresponding channel 28, it closes the corresponding switch 36 for a longer interval of time whereby the switch 36 causes a relay 36a to arrest the vibrator 23 of the corresponding channel 21a. The conveyors 24 and 27 continue to operate so that any candies which are accommodated in the channels 20 and 28 continue to travel toward the corresponding belts 31, 32. A suitable time-lag relay (not shown) then starts the temporarily arrested vibrator 23 to cause renewed advance of the temporarily arrested column in the corresponding channel 21a. The rear end portion of the corresponding channel 20 then receives a thinned-out column of candies with gaps 14a therebetween so that the misaligned candies have sufficient room for reorientation.

In actual use, at least the third and fourth conveyors 27 and 31–32 will operate continuously whenever the packing machine 10 is set in operation. The channels 21a or the channels 21a and 20 may be temporarily arrested by the switches 36, preferably in such a way that there is a phase displacement between the vibration of adjoining channels 21a and 20. During vibration of the channels 20, the corresponding channels 21a may be brought to a temporary halt in order to enable misaligned candies in the channels 20 to reorient themselves.

The entire apparatus is carried by a main supporting member 37 which is mounted on and extends laterally from the frame or housing of the packing machine 10. Suitable means are provided for preventing the vibrators 23, 26 and 29 of the adjoining first, second and third conveyors from undesirably influencing each other. It is further to be noted that the vibrators 23, 26 and 34 may be replaced by other types of drives. However, it was found that vibrators are particularly suited to effect forward movement of all candies and simultaneous reorientation of each misaligned candy.

Regardless of whether the switches 36 cause intermittent stoppage of vibrators 23 or 26, 29, the transporting unit invariably insures that the candies which enter the channels 20 have ample room to turn without overlying each other.

As stated before, the vibrating action imparted to the channels 20 of the second conveyor 24 is preferably such that candies advancing in the channels 20 move faster than candies in the channels 21a of the first conveyor 21. This can be achieved in different ways, namely, by continuously vibrating the channels 20 at a higher frequency and/or amplitude than the channels 21a, by continuously vibrating the channels 20 while the channels 21a are vibrated intermittently, or by intermittently vibrating the channels 20 and 21a but in such a way that the intervals between consecutive vibrations of the channels 21a are longer. Each channel 20 and 21a is preferably mounted independently of the other channels 20 or 21a so that it may be vibrated while the other channel or channels 21a, 20 are at a standstill, or vice versa. On the other hand, a single vibrator 34 normally suffices for all of the channels 28 on the third conveyor 27.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. An apparatus for arraying and advancing elongated stick-shaped products, particularly candies of other than cubical shape, to a packing or other consuming machine, comprising a source of randomly distributed products; a transfer station distant from said source; transporting means for advancing the products from said source to said station and for reorienting misaligned products so that each product reaches said station by moving lengthwise, said transporting means comprising a plurality of independent first conveyors having first elongated channels for receiving randomly distributed products from said source so that such products form separate substantially continuous columns and first drive means for advancing the columns lengthwise in a direction away from said source, and a plurality of independent second conveyors located between said first conveyors and said station and having second channels arranged to receive products seriatim from said first channel at such a rate that the products are separated by gaps wide enough to permit reorientation of each such misaligned product which advances in a position other than lengthwise, said second conveyor further comprising second drive means for effecting reorientation of misaligned products in said second channels and for advancing the products toward said station; and a rotary feeder provided at said transfer station and having a plurality of product-receiving holders 2. An apparatus as set forth in claim 1, wherein each of said drive means comprises a vibrator.

3. An apparatus as set forth in claim 1, wherein said second drive means is arranged to advance the products in said second channels at a speed which exceeds the speed of products in said first channels so that said gaps develop during transfer of products into said second channels.

4. An apparatus as set forth in claim 1, wherein said first drive means is arranged to operate intermittently so that said gaps develop in response to intermittent transfer of products from said first channels into said second channels.

5. An apparatus as set forth in claim 1, further comprising means for regulating the operation of said first and second drive means in such a way that the speed at which the products advance in said second channels exceeds the speed of products in said first channels.

6. An apparatus as set forth in claim 1, wherein said transporting means further comprises a third conveyor located between said second conveyors and said transfer station, said third conveyor comprising third elongated channels arranged to receive arrayed products seriatim from said second channels and third drive means for advancing the products in said third channels, toward said transfer station.

7. An apparatus as set forth in claim 6, further comprising detector means arranged to detect the products in said third channels and means for arresting at least one of said first and second drive means in response to detection of several closely adjacent products in said third channels.

8. An apparatus as set forth in claim 1, wherein said transporting means further comprises a third conveyor disposed between said second conveyors and said feeder, said third conveyor comprising a plurality of interconnected channels each arranged to receive a row of properly arrayed products from the channel of one of said second conveyors and single drive means for advancing the products along said interconnected channels.

9. An apparatus as set forth in claim 8, wherein said transporting means further comprises at least one additional conveyor for advancing rows of properly arrayed products from the channels of said third conveyor to said holders.

References Cited
UNITED STATES PATENTS

| | | | |
|---|---|---|---|
| 2,586,782 | 2/1952 | Buckeridge | 198—82 |
| 3,212,622 | 10/1965 | Metz | 198—34 |
| 3,227,263 | 1/1966 | Kastenbein | 198—220 X |
| 3,228,513 | 1/1966 | Voullaire | 198—30 |
| 3,250,372 | 5/1966 | Wagner et al. | 198—30 |
| 1,495,610 | 5/1924 | Paridon | 198—33 |
| 1,972,489 | 9/1934 | Rideout | 198—33 |
| 3,028,947 | 4/1962 | Robertson | 198—37 |

FOREIGN PATENTS

| | | |
|---|---|---|
| 703,492 | 2/1954 | Great Britain. |
| 712,388 | 7/1954 | Great Britain. |

EDWARD A. SROKA, *Primary Examiner.*

EVON C. BLUNK, *Examiner.*

A. C. HODGSON, *Assistant Examiner.*